(12) United States Patent
Lee et al.

(10) Patent No.: US 7,229,219 B2
(45) Date of Patent: Jun. 12, 2007

(54) APPARATUSES AND METHODS FOR INTEGRATING OPTO-ELECTRIC COMPONENTS INTO THE OPTICAL PATHWAYS OF ROUTING SUBSTRATES WITH PRECISION OPTICAL COUPLING AND COMPACT ELECTRICAL INTERCONNECTION

(75) Inventors: Michael G. Lee, San Jose, CA (US); Kishio Yokouchi, Tokyo (JP)

(73) Assignee: Fujitsu Limited (JP)

( * ) Notice: Subject to any disclaimer, the term of this patent is extended or adjusted under 35 U.S.C. 154(b) by 0 days.

(21) Appl. No.: 10/944,082

(22) Filed: Sep. 17, 2004

(65) Prior Publication Data

US 2006/0062522 A1    Mar. 23, 2006

(51) Int. Cl.
*G02B 6/42* (2006.01)
(52) U.S. Cl. .......................................... 385/91
(58) Field of Classification Search ............... None
See application file for complete search history.

(56) References Cited

U.S. PATENT DOCUMENTS

| | | | |
|---|---|---|---|
| 6,343,171 B1 | 1/2002 | Yoshimura et al. | |
| 6,393,171 B2 * | 5/2002 | Sasaki et al. | 385/14 |
| 6,400,742 B1 * | 6/2002 | Hatakoshi et al. | 372/46.01 |
| 6,400,855 B1 | 6/2002 | Li et al. | |
| 6,504,966 B2 | 1/2003 | Kato et al. | |
| 6,603,915 B2 | 8/2003 | Glebov et al. | |
| 6,611,635 B1 | 8/2003 | Yoshimura et al. | |
| 6,690,845 B1 | 2/2004 | Yoshimura et al. | |
| 6,821,878 B2 * | 11/2004 | Danvir et al. | 438/613 |
| 6,823,097 B2 | 11/2004 | Glebov et al. | |
| 6,828,606 B2 | 12/2004 | Glebov | |
| 2002/0114556 A1 | 8/2002 | Kato et al. | |
| 2003/0035614 A1 | 2/2003 | Glebov et al. | |
| 2003/0035632 A1 | 2/2003 | Glebov et al. | |

(Continued)

OTHER PUBLICATIONS

L. Dalton, et al., "Polymeric Electro-optic Modulators: From Chromophore Design to Integration with Semiconductor Very Large Scale Integration Electronics and Silica Fiber Optics," Ind. Eng. Chem. Res., Jan. 1999, pp. 8-33, vol. 38, No. 1.

(Continued)

*Primary Examiner*—Michelle Connelly-Cushwa
*Assistant Examiner*—Jerry T. Rahll
(74) *Attorney, Agent, or Firm*—Sheppard, Mullin, Richter & Hampton LLP

(57) ABSTRACT

Disclosed are apparatuses and methods for fast and reliable integration of opto-electric components onto optical routing substrates. Accurate alignment of optical signals to and from the opto-electric components, and short electrical interconnect paths to the components to reduce signal delays to the devices on the components are enabled. In an exemplary embodiment, an attachment area is set out on the optical routing substrate to receive each component. One or more optical waveguides for coupling optical signals with the component are located adjacent to the attachment area. A plurality of conductive pads are located within the attachment area, and are for interconnecting to the component by way of bodies of solder, conductive adhesive, or the like. Interspersed between the conductive pads are a plurality of spacers that set a spacing distance between the attachment area and the opposing surface of the component, resulting in accurate alignment of optical signals.

26 Claims, 4 Drawing Sheets

U.S. PATENT DOCUMENTS

| | | |
|---|---|---|
| 2003/0103712 A1 | 6/2003 | Glebov et al. |
| 2003/0202732 A1 | 10/2003 | Glebov et al. |
| 2003/0206675 A1 | 11/2003 | Glebov et al. |
| 2004/0028316 A1 | 2/2004 | Yokouchi |
| 2004/0126056 A1 | 7/2004 | Aoki et al. |
| 2004/0126079 A1 | 7/2004 | Aoki et al. |
| 2004/0206988 A1 | 10/2004 | Glebov |

OTHER PUBLICATIONS

S. Garner, et al., "Three-Dimensional Integrated Optics Using Polymers IEEE Journal of Quantum Electronics," Aug. 1999, pp. 1146-1155, vol. 35, No. 8.

Glebov, et al., "Two-dimensional microlens arrays in silica-on-silicon planar lightwave circuit technology," J. Microlith., Microfab., Microsyst., Oct. 2003, pp. 309-318, vol. 2 No. 4.

\* cited by examiner

APPARATUSES AND METHODS FOR INTEGRATING OPTO-ELECTRIC COMPONENTS INTO THE OPTICAL PATHWAYS OF ROUTING SUBSTRATES WITH PRECISION OPTICAL COUPLING AND COMPACT ELECTRICAL INTERCONNECTION

FIELD OF THE INVENTION

The present invention relates to methods and apparatuses that integrate opto-electrical devices into optical pathways with precise optical alignment, and preferably with compact interconnections of electrical signals to the opto-electric devices.

BACKGROUND OF THE INVENTION

At present, the amount of information being transmitted through internet and high-speed data exchanges between servers is at a high level and growing rapidly. The information-technology (IT) industry is already encountering the physical limits of current electrical components, interconnections and assembly technologies.

In making their invention, the inventors have recognized that optical devices could offer high speed data communication because the data signals stay within the optical layer throughout the entire routing path, without the need for expensive and complicated electrical-optical interfaces. However, that would require building complex optical communication systems with large numbers of opto-electronic devices and high degrees of functionality.

Currently, some of the most effective opto-electronic devices are constructed on substrates that cannot be used to construct the entire optical system, either because of prohibitive costs, and/or because such substrates are not large enough to support the entire optical system. As one workaround to this problem, some have used less effective opto-electronic devices because they could be readily incorporated on the substrates used for large-scale optical systems. However, this approach has the disadvantage of being constrained to using less effective opto-electronic devices. As another work-around, others have resorted to methods that first individually make the opto-electronic devices on individual mini-substrates (usually formed on a common substrate that is later diced into several mini-substrates), followed by attaching the mini-substrates to the main substrate of the optical system, and thereafter forming the optical waveguide structures of the optical system around the mini-substrates. However, this approach is expensive, is prone to misalignment of the optical core layers, usually requires precision polishing of the mini-substrates (to reduce their thicknesses), and constrains the processing temperatures for making the optical system to the highest temperature that the finished mini-substrate can withstand. Misalignment of optical components causes significant attenuation of the light signal. The possibility of misalignment must be considered when designing an optical system, and this consideration usually constrains the size and/or functionality of the optical system.

The present invention is made with a view to overcoming these disadvantages.

SUMMARY OF THE INVENTION

Broadly stated, the present invention encompasses apparatuses and methods for enabling the fast and reliable integration of opto-electric components onto optical routing substrates in a manner that enables accurate alignment of optical signals to and from the opto-electric components, and short electrical interconnect paths to the components to reduce signal delays to the devices on the opto-electric components. For each opto-electric component, an attachment area is set out on the optical routing substrate. Located adjacent to the attachment area are one or more optical waveguides for coupling (i.e., transmitting and/or receiving) optical signals with the component to be placed over the attachment area. A plurality of conductive pads are located within the attachment area, and are for interconnecting with the opto-electric component by way of bodies of solder or conductive adhesive, or the like. Also located within the attachment area and interspersed between the conductive pads are a plurality of spacers (preferably at least three) that set a spacing distance between the attachment area and the opposing surface of the opto-electric component. The thickness of the spacers is greater than the thickness of the conductive pads and is selected so as to align the core layers of the waveguides with the core layers of the opto-electric component. The alignment significantly reduces the optical losses in coupling optical signals to and from the opto-electric components.

As part of making their invention, the inventors have discovered that the top surfaces of conventional substrates used for optical routing applications permit leakage currents to flow from the conductive pads carrying high voltage to other conductive pads that are not supposed to be switched on at the same time or at the same voltage/polarity. To eliminate these leakage currents, the conductive pads and spacers are preferably formed over an insulating layer having good high-voltage insulating properties.

The configuration of spacers and conductive pads over the insulating layer simultaneously enables the provision of high voltage signals to the opto-electric components with low leakage current and short interconnect distance (compared to wire-bonding methods), and the reduction of optical losses in coupling optical signals to and from the components. In addition, the configuration provided by the present invention enables flip-chip bonding methods to be used for fast and accurate placement of the components over the attachment areas.

An exemplary method of forming an optical apparatus according to the present invention comprises forming at least a first waveguide over the top surface of a main substrate, with the first waveguide having a lower cladding layer, a core layer, a first end and a second end. The waveguide's first end is disposed adjacent to a side of an attachment area for an opto-electric component. Thereafter, an insulating layer is formed over the attachment area, and a plurality of spacers and conductive pads are formed over the insulating layer, with the spacers and conductive pads being separately located from one another. The spacers are formed such that their tops lie below a height defined by the interface plane between the core layer and lower cladding layer of the first waveguide. The formation of the spacers may precede the formation of the conductive pads, or the formation of the conductive pads may precede the formation of the spacers.

Accordingly, it is an object of the present invention to enable the fast and reliable integration of opto-electric components on an optical routing substrate and the like.

It is a further object of the present invention to enable low-loss coupling of optical signals between opto-electric components and optical routing substrates and the like.

It is a further object of the present invention to provide both low-loss coupling of optical signals between opto-electric components and optical routing substrates and high-speed interconnections of electrical signals from optical routing substrates to opto-electric components.

These objects and others will become apparent to one of ordinary skill in the art from the present specification, claims, and attached drawings.

DETAILED DESCRIPTION OF THE INVENTION

Figure 1:
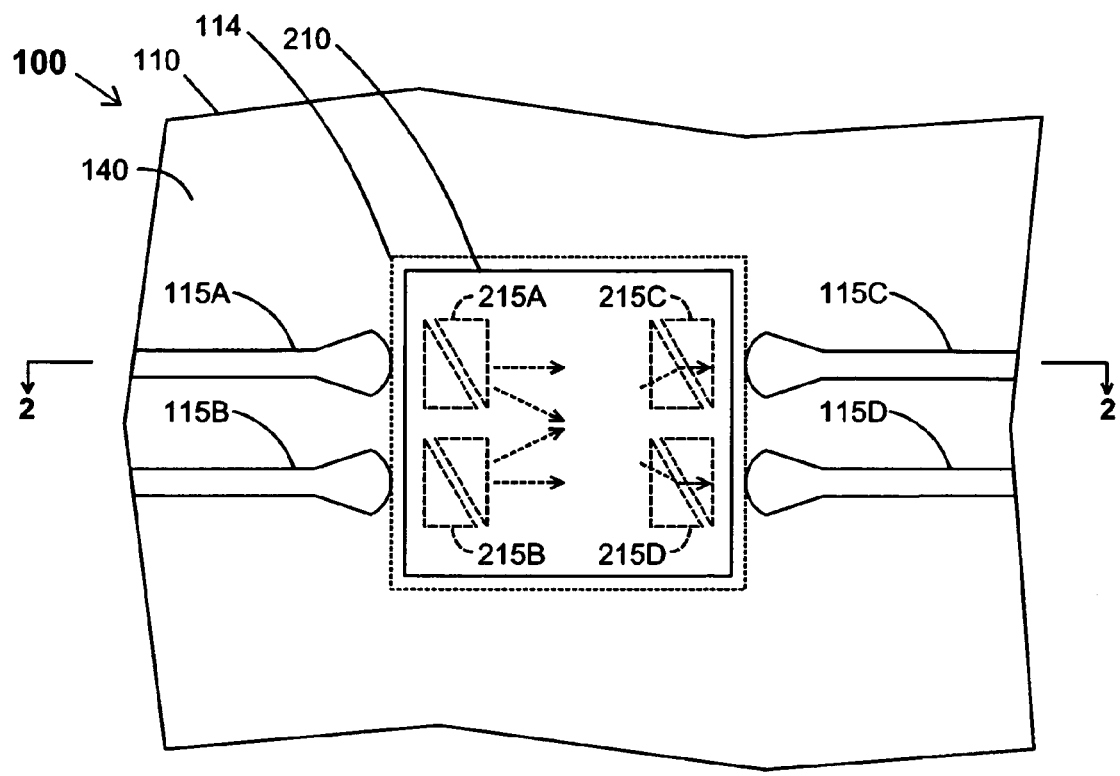
FIG. 1 shows a top plan view of an exemplary optical apparatus according to the present invention.
Figure 2:
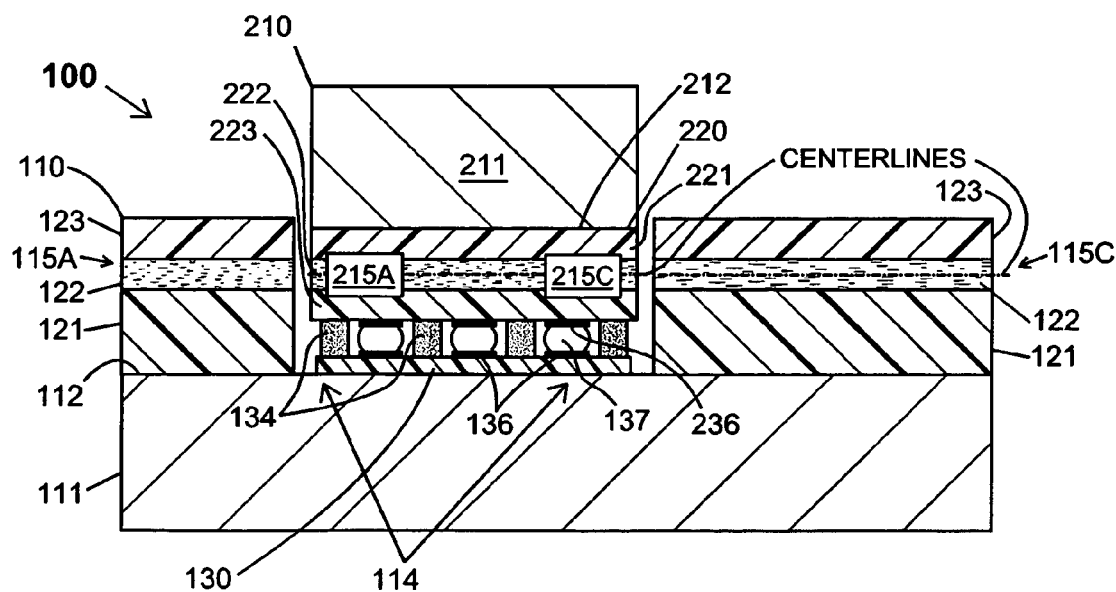
FIG. 2 shows a cross-sectional view of the exemplary optical apparatus shown in FIG. 1 according to the present invention.
Figure 3:
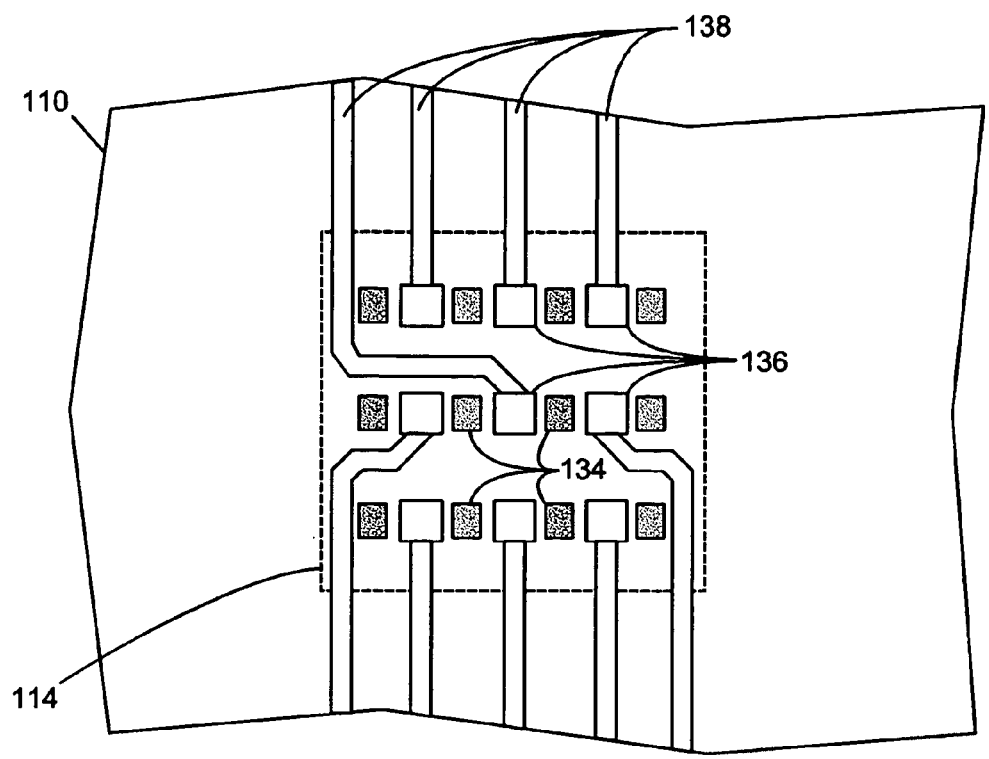
FIG. 3 shows a top plan view of the exemplary optical apparatus shown in FIG. 1 according to the present invention.

A first embodiment 100 of an optical apparatus according to the present invention is illustrated in FIGS. 1–3. A top plan view of optical apparatus 100 is shown in FIG. 1, a cross-sectional view is shown in FIG. 2, and second top plan view is shown in FIG. 3 with a component removed (as explained below). Referring to FIG. 1, Apparatus 100 comprises a main optical board 110 having a top surface, and an attachment area 114 located at the top surface for receiving an opto-electric component 210. Main optical board 110 comprises a plurality of optical waveguides 115A–115D, and opto-electric component 210 comprises a plurality of opto-electric devices 215A–215D. Each waveguide 115A–115D preferably has a microlens formed at its end, with the end being disposed adjacent to a side of attachment area 114 and facing opto-electric component 210. The microlenses of waveguides 115A and 115B serve to collimate or cross-collimate the waveguide's light beam into a light beam having a broader beam width for entry into opto-electric component 210. The microlenses of waveguides 115C and 115D converge the broad light beams as they exit from opto-electric component 210. In exemplary embodiments, a fill layer 140 is disposed around waveguides 115A–115D and around area 114, thereby forming a recess over area 114 in which component 210 is to be disposed. Fill layer 140 serves to planarize the top surface of main optical board 110, and can serve to provide a dielectric cover for electrical traces disposed below it (as described in greater detail below). Also, the material for fill layer 140 may be selected such that layer 140 acts as a side cladding layer.

In one exemplary application, apparatus 100 is configured as a 2×2 optical switch where an optical signal propagating through waveguide 115A may be selectively routed to either of waveguides 115C or 115D, and where an optical signal propagating through waveguide 115B may be selectively routed to either of waveguides 115C or 115D. Preferably, the optical signals in waveguides 115A and 115B are always routed to different ones of waveguides 115C and 115D. The selective routing is accomplished by opto-electric devices 215A–215D, each of which may comprise a dual-prism deflector. In an exemplary state of operation, opto-electric device 215A receives a light beam from waveguide 115A, and either allows the light beam to pass straight through to waveguide 115C or deflects the light beam toward waveguide 115D, depending upon the voltages applied to the electrodes of opto-electric device 215A. In the case where device 215A passes the light beam straight through to waveguide 115C, opto-electric device 215C is set in a state that allows the light beam to pass through it without substantial deflection. In the case where opto-electric device 215A deflects the light beam toward waveguide 115D, the light beam is at an angle to the optical axis of waveguide 115D, and opto-electric device 215D is configured to deflect the light beam a second time so that it substantially propagates along the optical axis of waveguide 115D. In a similar manner, opto-electric device 215B receives a light beam from waveguide 115B, and either allows the light beam to pass straight through to waveguide 115D or deflects the light beam toward waveguide 115C, depending upon the voltages applied to the electrodes of opto-electric device 215B. In the case where device 215B passes the light beam straight through to waveguide 115D, opto-electric device 215D is set in a state that allows the light beam to pass through it without substantial deflection. In the case where opto-electric device 215B deflects the light beam toward waveguide 115C, opto-electric device 215C is configured to deflect the light beam a second time so that it substantially propagates along the optical axis of waveguide 115C.

The cross-sectional view of FIG. 2 illustrates the construction of main optical board 110, opto-electric component 210, waveguides 115A–115D, and opto-electric devices 215A–215D in greater detail. Each of waveguides 115A–115D comprises a lower cladding layer 121, a core layer 122, and an optional upper-cladding layer 123, disposed in that order over top surface 112 of substrate 111. Attachment area 114 for receiving component 210 is located above top surface 112, and between waveguides 115A–115B on the one side, and waveguides 115C–115D on the other. In preferred embodiments of the present invention, waveguides 115A–115D are formed from a common lower cladding layer 121, a common core layer 122, and a common upper cladding layer 122, and are defined by at least the pattern etching of the common core layer 122 and the removal of layers 121–123 within attachment area 114. When layers 121–123 comprise silica (e.g., glass) material, it will usually be preferred to use a common etching step to simultaneously pattern-etch layers 121–123 in the waveguide patterns shown in FIG. 1, and to thereafter form fill layer 140 around the waveguides and around attachment area 114. In either case, a recess can thereby be created over attachment area 114, in which opto-electric component 210 may be disposed. The recess over attachment area 114 extends through layers 123 and 122, and preferably through at least a portion of lower cladding layer 121. The recess may also extend through all of layer 121 to reach top surface 112 of substrate 111, as is the case with the example illustrated in FIGS. 1–3.

Opto-electric component 210 comprises a support substrate 211, a first cladding layer 221 disposed over substrate 211, a core layer 222 disposed over first cladding layer 221, and an optional second cladding layer 223 disposed over core layer 222. Cladding layers 221 and 223 are also referred to as the lower cladding layer and upper cladding layer, respectively, with the understanding that opto-electric component 210 has been flipped (inverted) from its normal orientation (top surface below bottom surface). The locations of opto-electric devices 215A and 215C are schematically shown in FIG. 2. Light is coupled to and from devices 215A–215D by way of core layer 222. Opto-electric devices 215A–215D generally abut core layer 222, and may be integrally formed with core layer 222 (as well as integrally formed with one or both of cladding layers 221 and 223). For example, each device may be formed in or through layers 221–223. If needed, core layer 222 may be pattern-etched to provide optical routing paths to and from devices 215A–215D. In the case of the exemplary 2×2 optical switch shown in FIGS. 1–2 for component 210, no routing paths are needed.

Each of devices 215A–215D generally has a plurality of electrodes that are to be electrically coupled to corresponding electrical signals present on main optical board 110. To provide this interconnection, a plurality of conductive pads 236 may be disposed on the top surface of component 210. Conductive pads 236 are electrically coupled to corresponding conductive pads 136 on main optical board 110 through conductive bodies 137. Conductive bodies 137 may comprise conventional solders and conventional electrically-conductive adhesives. Conductive pads 136 are preferably disposed over an insulating layer 130 in order to electrically isolate them from substrate 111. Insulating layer 130 is located over area 114, and below the level of core layer 122.

To provide good optical coupling between waveguides 115A–115D and opto-electric devices 215A–215D, core layer 122 of main optical board 110 is aligned to core layer 222 of component 210. To provide this alignment, main optical board 110 comprises a plurality of spacers 134 disposed over insulating layer 130, and interspersed between conductive pads 136. Spacers 134 are relatively rigid, being more rigid than the viscous state of conductive bodies 137 that occurs when conductive bodies 137 undergo solder reflow or initial adhesive curing, depending upon the material used for bodies 137. In addition, spacers 134 have a thickness that is greater than the thickness of conductive pads 136, and that is selected so that core layers 222 and 122 are substantially aligned with one another. In general, the combined thickness of spacer 134 ($T_{134}$), insulating layer 130 ($T_{130}$) and cladding layer 223 ($T_{223}$) is substantially equal to the exposed thickness of lower cladding layer 121 ($T_{121}$) adjacent to area 114. The thickness $T_{121}$ of lower cladding layer 121 is measured from the bottom of attachment area 114 (e.g., the bottom of the recess) to the top surface of layer 121. In the exemplary embodiment shown in FIGS. 1–3, the bottom of area 114 is at the top surface 112 of substrate 111, and so the thickness $T_{121}$ is equal to the full thickness of lower cladding layer 121. In general, the thickness $T_{134}$ of spacers 134 is less than the thickness $T_{121}$ of lower cladding layer 121, and the combined thickness ($T_{130}+T_{134}$) of layers 130 and spacer 134 is less than or equal to the thickness $T_{121}$ of lower cladding layer 121. Also, the tops of spacers 134 lie below the height level defined by the planar interface between core layer 122 and first lower cladding layer 121.

In general, the core layers 122 and 222 may have different thicknesses. In this case, the height of spacers 134 is preferably selected so that the centerlines of core layers 122 and 222 are collinear (i.e., so that the centerlines are aligned to be at the same level). Having $T_{122}$ denote the thickness of core layer 122 and having $T_{222}$ denote the thickness of core layer 222, the centerlines of the core layers are collinear under the following condition:

$$T_{130}+T_{134}+T_{223}+\tfrac{1}{2}T_{222}=T_{121}+\tfrac{1}{2}T_{122}.$$

This gives a preferred value for the spacer thickness $T_{134}$ as follows:

$$T_{134}=T_{121}+\tfrac{1}{2}T_{122}-(T_{130}+T_{223}+\tfrac{1}{2}T_{222})$$

However, preferred embodiments may have a degree of misalignment of the centerlines of core layers 122 and 222. This misalignment is the difference between the height levels of the centerlines of the core layers, as measured from a common plane such as surface 112, and the misalignment is preferably kept within a value of $\tfrac{1}{2}T_S$, where $T_S$ is the thickness of the thicker of the two core layers 122 and 222. That is to say, the vertical spacing distance between the centerlines is preferably less than or equal to $\tfrac{1}{2}T_S$. To achieve this, the thickness $T_{134}$ of spacers may satisfy the following relationship:

$$[T_{121}+\tfrac{1}{2}T_{122}-(T_{130}+T_{223}+\tfrac{1}{2}T_{222})]-\tfrac{1}{2}T_S \leq T_{134} \leq [T_{121}+\tfrac{1}{2}T_{122}-(T_{130}+T_{223}+\tfrac{1}{2}T_{222})]+\tfrac{1}{2}T_S.$$

In general, one seeks to achieve the best alignment for all of the waveguides 115A–115D to all of the devices 215A–215D. For this, several factors may be considered, such as the thickness uniformity of the relevant layers, the warpage of component 210, and the warpage of main optical board 110 in the location of attachment region 114. Using statistical methods well known to the semiconductor manufacturing art, the average thickness and deviations of the layers can be computed for the processing conditions used, and appropriate layer thicknesses can thereafter be selected.

The preferred heights of spacers 134 may be defined in the following manner as well. We define a first level at the planar interface between core layer 122 and lower cladding layer 121, and a second level at the top surface of core layer 122, both levels being measured at an end of a waveguide and referenced from a common plane, such as top surface 112. The tops of spacers 134 preferably lie below the second level by at least an amount equal to ($\tfrac{1}{2}T_{222}+T_{223}$), where $T_{222}$ and $T_{223}$ are measured at an area adjacent to the waveguide end and above a spacer 134. However, the tops of spacers 134 preferably do not lie below the first level by more than an amount equal to ($\tfrac{1}{2}T_{222}+T_{223}$).

FIG. 3 shows a top view of main optical board 110 with core layer 122, cladding layers 121 and 123, waveguides 115A–115D, and fill layer 140 removed for clarity. FIG. 3 shows an example of how spacers 134 may be interspersed between conductive pads 136 (e.g., each spacer 134 is separately located from each conductive pad and is not disposed on top of a conductive pad). Nine conductive pads 136 are shown as an example. This enables two control signals to be fed to each of devices 215A–215D by way of conductive pads 136, plus a ground signal to be fed to opto-electric component 210, which may be used to feed a ground potential to a ground shield on component 210 and/or to provide a ground potential to each of devices 215A–215D. Also shown in FIG. 3 are a plurality of electrical traces 138 that are electrically coupled to respective conductive pads 136 to provide control signals thereto. In prior art approaches, the electrical signals to component 210 would be provided by wire bonds or wire ribbons, which would connect to the backside of component through long leads having high inductance. In contrast, the electrical traces 138 and conductive pads 136 of the present invention enable the connection of the electrical signals directly to the top surface of component 210 where the devices 215A–215D reside, and also enable the traces to be formed over a ground plane to provide a controlled impedance. Such a ground plane can be provided by a substrate 110 having a conductive surface 112 or conductive body. The controlled impedance reduces signal delay and signal dispersion compared the case of using inductive wire bonds or wire ribbons. In addition, the arrangement of conductive pads 136 and traces 138 under component 210 results in a more compact main optical board 110 since there is no need to dedicate area on the top surface of board 110 for wiring.

Figure 4:
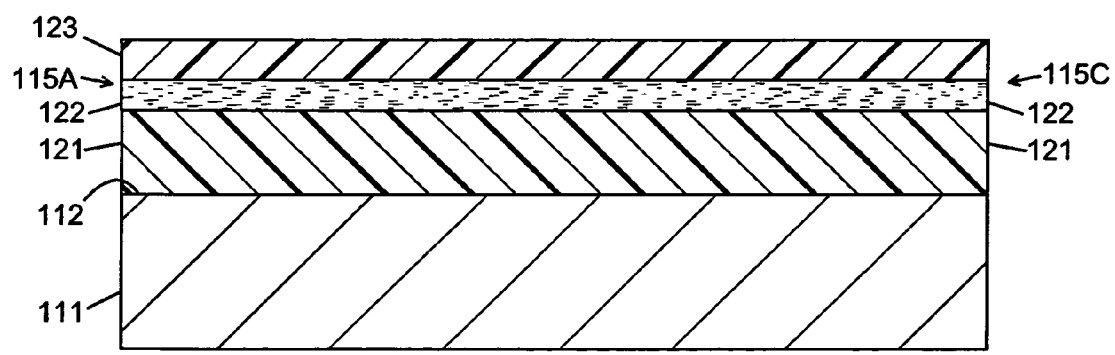
FIGS. 4–10 are cross-sectional views of an exemplary apparatus as it is being constructed by methods according to the present invention.
Figure 5:
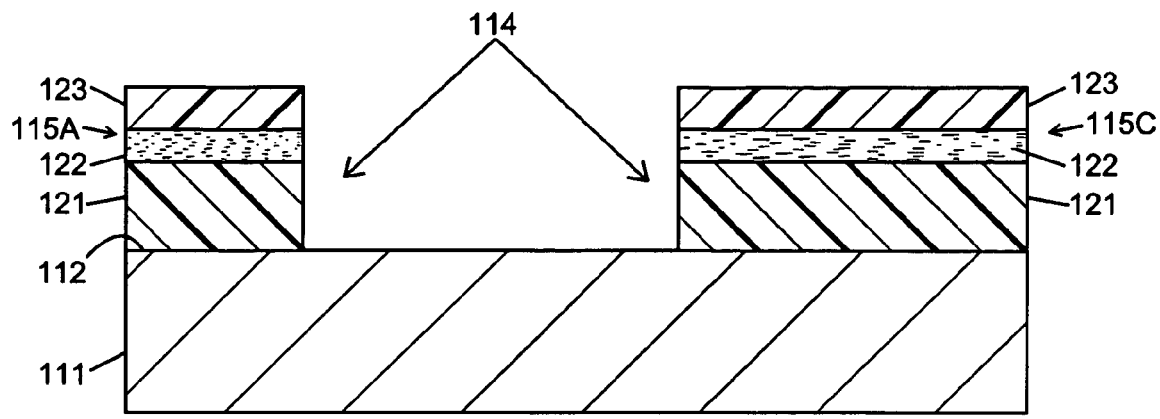

Exemplary methods of constructing main optical board 110 are now described. Referring to FIG. 4, starting with substrate 111, lower cladding layer 121 is formed over substantially the entire top surface 112 of substrate 111, and core layer 122 is thereafter formed over substantially the entire top surface of layer 121. Upper cladding layer 123 is then formed over substantially the entire top surface of core layer 122. Thereafter, all three layers 121–123 are pattern-etched to define waveguides 115A–115D. A cross-section of the resulting structure is shown in FIG. 5. For the pattern-etching step, one may use a conventional process of applying photo-resist, then patterning the photo-resist, and thereafter etching away the exposed portions of layers 121–123 using an etchant that is suitable for removing the material of layers 121–123. As an example, substrate 111 may comprise a silicon wafer, and each of layers 121–123 may comprise glass ($SiO_2$). In this case, plasma-etching may be used to remove the exposed portions of layers 121–123. Certain plasma-etching processes known in the art etch glass at a substantially faster rate than silicon. Such etching processes can be used to ensure that the side walls of waveguides 115A–115D are smooth and near vertical by allowing the etching process to continue for a while after it has etched down to the silicon substrate 111. This over-etching causes a modest amount of etching into silicon substrate 111, and the exposed silicon surface is oftentimes conductive because of one or more dopants within the silicon. Below, we address the issue of the substrate's conductive surface and its potential impact on conductive pads 136.

Layers 121–123 may also comprise polymeric materials, and may further comprise photo-imageable polymeric materials. In the latter case, layers 121–123 may be patterned by direct photo-imaging followed by development (e.g., exposure to a developer solution). If layers 121–123 are not photo-imageable, one may form an etch mask over upper cladding layer 123, pattern it to form the outlines of waveguides 115A–115D, and thereafter etch the exposed portions of layers 121–123. Anisotropic etching is preferred, and several known plasma-etching gases may be used. In the case of plasma-etching, the mask layer may comprise a photo-resist layer. However, a more durable masking material is typically preferred, such as metal or a deposited silicon nitride layer. The layer of more durable masking material can be patterned by a regular photo-resist layer followed by etching using a selective etchant for the masking material.

In order to obtain good wave-guiding properties, the refractive index of core layer 122 should be larger than the indices of refraction of the cladding layers 121 and 123, usually by at least 0.2%. When using polymeric material for layers 121–123, different polymeric materials having different refractive indices may be selected. To obtain a difference in the refractive index when using glass for layers 121–123, different impurities known to the art may be added to the glass layers as they are formed, or the glass layers may be formed with different densities (with core layer 122 being more dense), or a combination of these approaches may be used. Typically, core layer 122 can have a thickness in the range of 2 μm to 10 μm, and lower cladding layer 121 can have a thickness in the range of 5 μm to 15 μm. Upper cladding layer 123 can have a thickness in the range of 5 μm to 15 μm. The combined thickness of layers 121–123 (i.e., the thickness of the optical waveguides 115A–115D), can range between 20 μm to 30 μm when using glass (silica) materials. The same thickness values may be used when layers 121–123 comprise polymeric materials and other dielectric materials.

A minor drawback of the above processing steps is that portions of core layer 122 are exposed at the side walls of waveguides 115A–115D. If a medium having an index of refraction substantially equal to or greater than that of core layer 121 is disposed next to these side wall portions of the core layers 122 of waveguides 115A–115D, the waveguides will have poor transverse confinement of the light. This potential problem may be addressed by selecting a material for fill layer 140 that has an index of refraction that is less than that of core layer 121, preferably less by an amount of at least 0.2%. As another approach, which is useful when layers 121–123 comprise polymeric materials, the formation of layer 123 may be delayed until after conductive pads 136 have been formed (as described below). In this case, only layers 121 and 122 are formed and pattern-etched together at this stage. Then, upper cladding layer 123 is formed at a later stage to serve as itself as well as fill layer 140 (i.e., both layers would be the same layer in this modified process). If, for some reason it is not desirable to have upper cladding layer 123 serve as fill layer 140, or if is not desirable to delay the formation of layer 123 for processing reasons, then one can use the following processing sequence: form layers 121 and 122; pattern-etch core layer 122; form upper cladding layer 123 to cover the top and side walls of core layer 122 and the exposed portions of lower cladding layer 121; and then pattern-etch layers 121 and 123 to expose area 114 and other areas of top surface 112 of substrate 111 needed to support electrical traces to conductive pads 136 (as described below). The last pattern-etching step would preferably leave portions of upper cladding layer 123 along the side walls of waveguides 115A–115D.

Figure 6:
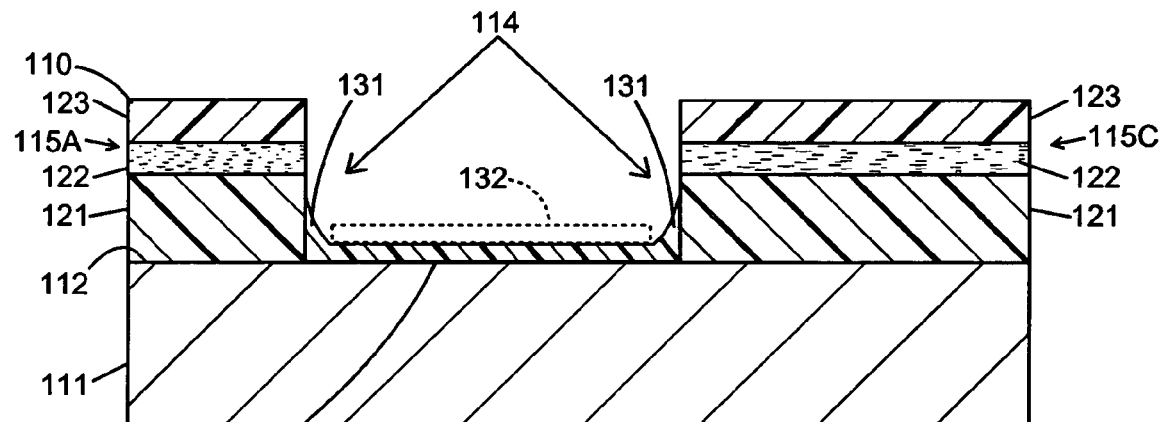

Referring to FIG. 6, as the next step, insulating layer 130 is formed over attachment area 114 and other areas of top surface 112 where electrical traces 138 are to be formed in a subsequent step. (The locations of traces 138 are shown in FIG. 3.) The material for layer 130 may comprise a photo-epoxy material, which may be formed over the entire top surface of main optical board 110, and thereafter photo-exposed and developed (i.e., selectively removed) to leave portions over area 114 and other areas of top surface 112 where electrical traces 138 are to be formed. After these steps, the remaining photo-epoxy is cured, such as by exposure to elevated temperature and/or ultraviolet light. Insulating layer 130 ensures that conductive pads 136 are electrically isolated from one another, which may not be the case if pads 136 were directly formed on a surface portion of substrate 111 that had been plasma-etched.

Insulating layer 130 may also comprise other types of insulating materials, particularly those that can be deposited or spin-coated. For example, polyimide (which is typically spun on and cured) may be used, and deposited silicon nitride may be used. Suitable adhesion layers for these materials may be formed over the surface beforehand. Given the material for layer 130, it is well within the ordinary skill in the art to select a suitable adhesion layer.

Figure 7:
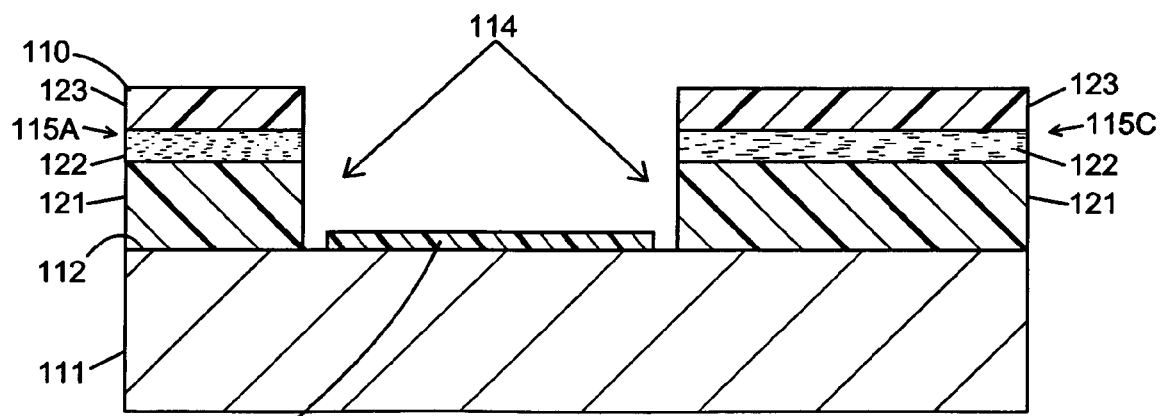

In preferred embodiments, layer 130 may be made relatively thin, on the order of approximately 2 μm, which would provide an insulating resistance of approximately 100 MΩ at an operating voltage of 100V for typical photo-epoxy materials. Typically, the thickness of layer 130 ranges from about 1 μm to about 4 μm. The formation of such a thin layer with a uniform thickness can be difficult if the distance between the opposing faces of waveguides 115A and 115C is small, such as smaller than about 5 mm. The problem is that the thickness of layer 130 increases as it nears the end faces of waveguides 115A–115D. A uniform thickness can be readily achieved if larger spacing distances between the opposing faces of the waveguides are used. However, larger spacing distances are contrary to market demands on optical boards to handle more optical signals and to house more opto-electric devices at greater densities. To address this problem, the inventors have included the following additional processing steps for layer 130, as an option when needed. After layer 130 has been initially formed and patterned (but preferably before it is cured if curing is required), a plasma-masking layer 132 (shown by dashed lines in FIG. 6) is formed over layer 130 except for small portions 131 that are located in front of the ends of waveguides 115A–115D. These small portions 131 are locations of non-uniform thickness in the originally disposed layer 130. The exposed portions of layer 130 are then exposed to an oxygen RIE plasma-etching step (reactive-ion-etching step) to remove portions 131. Mask 132 is thereafter removed, and the resulting structure is shown in FIG. 7.

Depending upon the formulation of the etching gas and the composition of upper cladding layer 123, portions of layer 123 may also be removed. However, these portions can be compensated for by initially making layer 123 thicker than the desired final value. Also, mask 132 can be disposed over the top surface of layer 123 to protect it from the etching gas. The plasma-etching step is able to increase uniformity of thickness of layer 130. For applications of components 210 that have thin wave-guiding layers, the thickness uniformity of layer 130 is important for the leveling of components 210 with respect to optical axes of waveguides 115A–115D.

Masking layer 132 may comprise a number of plasma-masking materials known to the art, such as metal, polyimide, and photo-resists (e.g., sacrificial photo-resists, which are also etched during the etching process). However, when layer 130 comprises a material that requires curing, it is best to use a masking material that does not require significant curing (soft-baking is acceptable). As an alternative, one may cure layer 130 before forming masking layer 132, which would provide greater flexibility in the selection of masking materials. Also, layer 130 may comprise a material that does not require curing, as indicated above.

Figure 8:
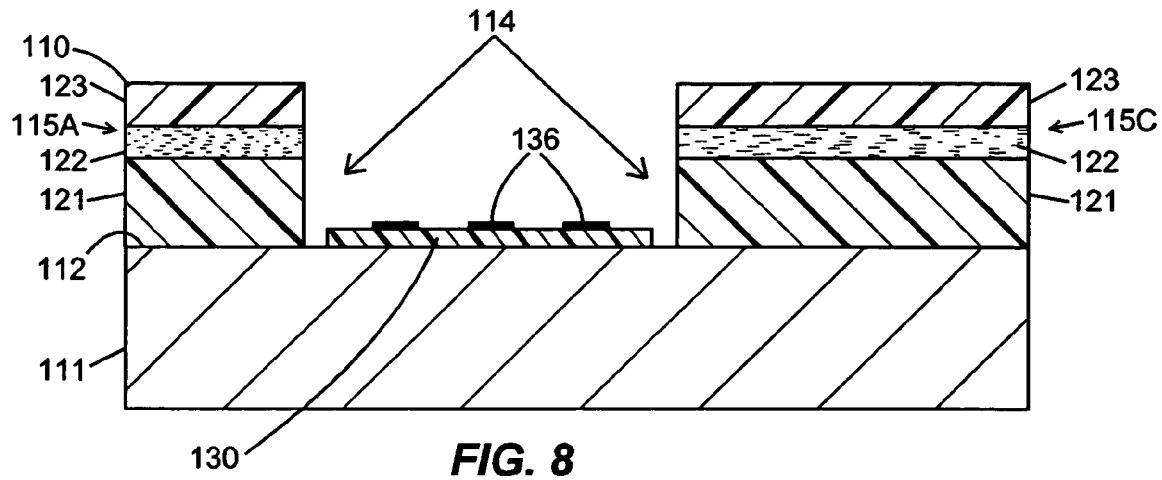

Referring to FIG. 8, as the next exemplary step, conductive traces 138 and conductive pads 136 are formed over insulating layer 130. This may be accomplished by a number of ways. In one way, a uniform layer of conductive material (e.g., a metal layer) is deposited over the top surface of component 110, and thereafter pattern-etched using photolithography and etching to define traces 138 and pads 136. As another way, a "lift-off" process may be used to define the traces and pads. In this process, a photo-resist layer is formed and patterned to define the locations where the pads and traces are to go. Then, a metal layer is disposed over the photo-resist layer, such that the metal layer has breaks in continuity at the side edges of the photo-resist layer. The photo-resist layer is thereafter removed by a solvent, which reaches the photo-resist layer through the breaks in continuity of the metal layer. To facilitate the removal, the photo-resist layer is made thicker than the metal layer. The metal layer may have a multilayered structure, such as a lower metal adhesion layer (e.g., chromium), a middle layer that provides good electrical conduction (e.g., copper), and a top layer that provides good adhesion with conductive bodies 137 (e.g., nickel), which are formed later. In many cases, a single metal can provide the function of the middle and top sub-layers, such as copper when used with indium-tin for conductive bodies 137. This is the case when all of the devices on a component 210 are prism deflectors that need high voltage but low current. In this case, conduction pads 136 may comprise a thin adhesion layer and a thin copper layer.

Figure 9:
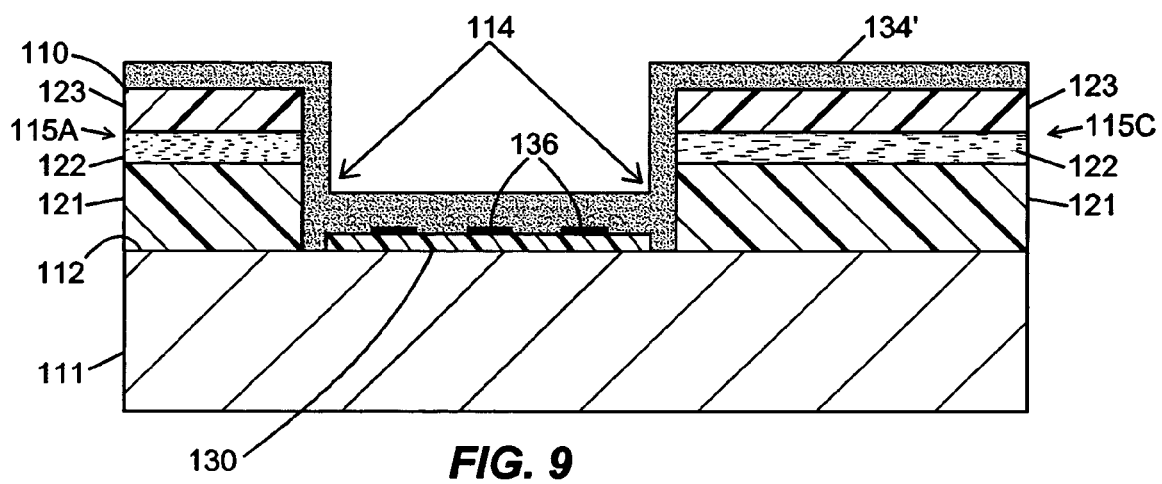
Figure 10:
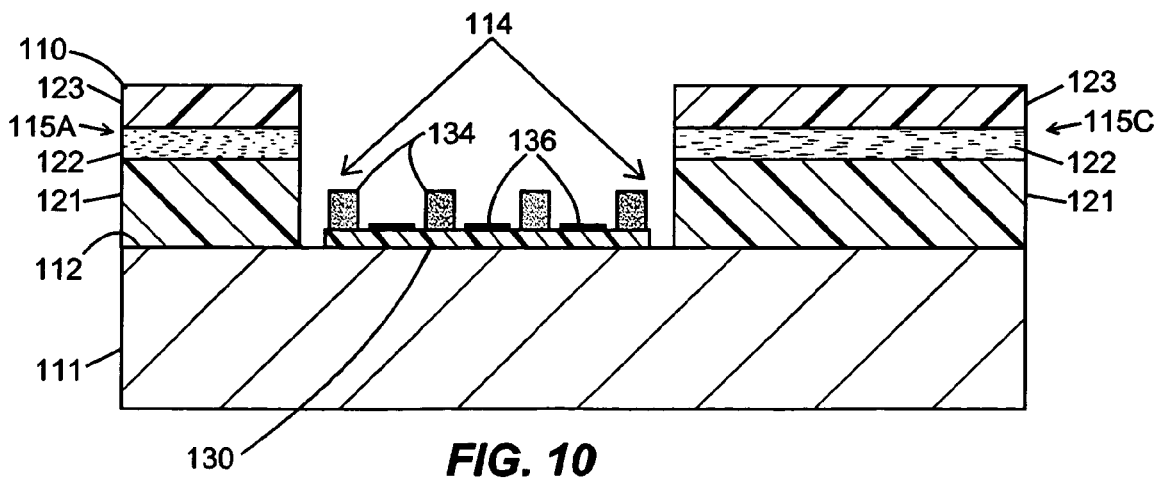

Referring to FIGS. 9 and 10, as the exemplary next step, spacers 134 are formed. A number of approaches may be used, and this step of forming spacers 134 may precede the above step of forming conductive pads 136, if desired. As one preferred approach of forming spacers 134, a thick layer 134' of material for the spacers is formed over the top surface of component 110, as shown in FIG. 9. Layer 134' is thereafter patterned to define the individual spacers 134, the result of which is shown in FIG. 10. The patterning may be accomplished by using a photo-epoxy for layer 134', and exposing the layer 134' to a photolithographic imaging step. It may also be accomplished by using a material that is not photo-imageable for layer 134', then forming a patterned plasma-etching mask over layer 134', and thereafter plasma-etching layer 134', followed by removing the mask. The material of layer 134' preferably has good temperature stability so that it can withstand the pressure and high temperature applied in a subsequent step to bond conductive bodies 137 to conductive pads 136 and 236. Specifically, the material preferably has a glass transition temperature substantially above subsequent processing temperatures, and preferably has a Young's modulus, as measured at the subsequent bonding temperature, that is sufficiently high to limit the amount of vertical deflection that each spacer 134 undergoes. For example, if a bonding pressure of 0.05 N/cm$^2$ is used and the strain is to be limited to 5% at the bonding temperature, then the Young's modulus should be greater than $1\times10^4$ Pa at the bonding temperature.

If layer 134' comprises a photo-epoxy, the following additional actions are preferred. After the layer is initially formed, it is soft-baked to remove solvents before exposure to actinic radiation through a pattern mask. After exposure to actinic radiation, the layer is typically soft-baked again (called a post-exposure bake) to induce an amount of polymerization in the exposed portions of the layer, thereby effectively setting the pattern in the layer before it is exposed to the developing solution. At this point, the patterned epoxy has been cured to an intermediate stage of polymerization (in other words, it is not fully polymerized and not fully cured). After exposure to the developer solution, additional exposure to elevated temperature may be done to achieve further polymerization for increased mechanical stability. However, for practicing the present invention, it usually is not necessary to fully cure the epoxy at this stage if one selects an epoxy that has sufficient rigidity for the subsequent bonding step described below. In this regard, it is typically desirable to induce a sufficient degree of polymerization to raise the glass-transition temperature (Tg) of the partially-cured epoxy to a level that is 10° C. to 20° C. above the reflow temperature of the bonding step described below. Before exposure to actinic radiation, typical photo-epoxies have Tg values of around 50° C. After exposure to actinic radiation and after full curing, typical photo-epoxies have Tg values of around 200° C. Therefore, one can adjust the Tg value of a partially-cured epoxy by varying the time and temperature of the post-exposure bake. As indicated below, Sb/In solders have reflow temperatures of around 120° C. Therefore, a photo-epoxy layer 134' can be partially cured during the post-exposure bake to readily reach a Tg value of 130° C. to 140° C. As examples, one may use the ultraviolet-light curable UV10 and UV15 series of photo-epoxies manufactured by Master Bond Inc., or the SU-8 series of photo-epoxies manufactured by the MicroChem Corporation. Typically, the epoxy may be cured to a glass transition temperature of around 120° C. to around 180° C., with ranges from around 130° C. to around 160° C. and around 140° C. to around 180° C. being typical.

The formation process of opto-electric component 210 depends upon the particular opto-electric devices 215A–215D being integrated onto the component. In general, there is a first set of steps for forming the waveguide layers 221–223, which may be similar or identical to some of the steps for forming layers 121–123, described above. Then there is a second set of steps for forming devices 215A–215D. The first set of steps may precede the second set of steps, or the second set of steps may precede the first set of steps. However, the steps are usually performed in an intermixed manner to eliminate duplicative steps, to reduce wastage of material layers, and to provide closer integration of the devices 215A–215D and the waveguide-layers 221–223. One of the final steps for making component 210 is the formation of conductive pads 236, which may be performed by the approach outlined above for forming conductive pads 136. In view of the teaching of the present application, it is within the capabilities of one of ordinary skill in the art to make component 210.

To assemble component 210 to main optical board 110, bodies 137 of conductive material are formed on conductive pads 136 or conductive pads 236 (formation on both pads 136 and 236 is also possible). In preferred embodiments, the conductive material comprises a low-melting point tin-indium solder (Sn/In), which reflows at a temperature of approximately 120° C. This low temperature (compared to PbSn solders) is preferred when using epoxy materials for spacers 134, since it is generally below the glass transition temperature of the partially-cured epoxy material. In addition, the low reflow temperature minimizes the impact of heat shock on the optical devices of component 210. Conductive bodies 137 are initially made in the form of pillars that are preferably a few microns higher than the height of spacers 134. This ensures good initial contact to pads 236 or pads 136 during bonding. After this initial formation of conductive bodies 137, component 210 is flip-chip bonded to main optical board 110 in area 114. Heat and light pressure are applied to the backside of component 210 during the flip-chip bonding process to cause conductive bodies 137 to soften and be pressed down to substantially the same height as spacers 134. A pressure of 0.1 N/cm$^2$ or less is usually sufficient, and the heat should be sufficient to raise the temperature of conductive bodies 137 to the reflow temperature of their constituent material. (The amount of pressure needed decreases as the number of conductive bodies 137 decreases.) Conductive bodies 137 then reflow and form bonds to conductive pads 136 and 236. With adequate temperature and the use of copper at the top surfaces of pads 136 and 236, the tin-indium alloy can form intermetallic bonds with the copper layers to increase the bonding strength between each conductive body 137 and a set of opposing pads 136 and 236. During the flip-chip bonding process, spacers 134 serve to maintain the spacing distance to achieve the desired alignment of core layers 122 and 222, as described above. In addition, when spacers 134 comprise partially-cured epoxy material, they can form adhesive bonds to the top surface of component 210 where they make contact.

Once sufficient time has passed for conductive bodies 137 to reflow and adhere to (i.e., wet to) the surfaces of conductive pads 136 and 236, heat is removed to allow conductive bodies 137 to cool to a solid state. During this time, light pressure is preferably maintained at the backside of component 210 so as to maintain the alignment of core layers 122 and 222. In addition, spacers 134 maintain the vertical alignment of core layers 122 and 222. In this way, spacers 134 provide a controlled amount of standoff height, and the initial height and uniformity of conductive bodies 137 is not as critical as it would be in the case when spacers 134 are not used.

As indicated above, conductive bodies 137 convey electrical signals between component 210 and main optical board 110. Generally, there will be a sufficient number of conductive bodies 137 to maintain the connection of component 210 to board 110 during the thermal cycles encountered during the operation of the optical apparatus. In addition, when spacers 134 are formed from epoxy material, the top surfaces of the spacers will provide some adhesion to component 210. However, in some cases where component 210 only needs a few electrical connections, there may not be sufficient adhesion to maintain the connection between component 210 and board 110 during thermal cycling. In this case, "dummy" conductive pads 136 and 236 may be added to board 110 and component 210 in locations where no electrical connection is needed, and additional conductive bodies 137 may be used to connect to the "dummy" pads. In addition, after the bonding step, additional reinforcement can be accomplished by disposing an adhesive (e.g., an optical glue with a refractive index close to that of the core layers) around the sides of component 210 and over the top thereof. In addition, clips to hold component 210 in place may be used alone or in combination with the adhesive.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. An optical apparatus comprising:
   a main substrate having a top surface;
   an attachment area located on the top surface of the main substrate and for receiving an opto-electric component;
   a first waveguide, the first waveguide being disposed over the top surface of the main substrate and having a first end and a second end, the first waveguide further having a lower cladding layer disposed over the top surface and a core layer disposed over the lower cladding layer, the first end of the first waveguide being disposed adjacent to a side of the attachment area;
   an electrically insulating layer formed over the attachment area;
   a plurality of conductive pads disposed on the insulating layer and located over the attachment area, the conductive pads having a thickness; and
   a plurality of spacers disposed on the insulating layer and located over the attachment area, each spacer having a thickness that is greater than the thickness of the conductive pads, each spacer being separately located from each conductive pad.

2. The optical apparatus of claim 1 wherein the planar interface between the first core layer and the first lower cladding layer defines a first level above the top surface of the main substrate, wherein the tops of the spacers lie below the first level.

3. The optical apparatus of claim 1 wherein the thickness of each spacer is less than the thickness of the lower cladding layer.

4. The optical apparatus of claim 1 wherein the combined thickness of the insulating layer and one of said spacers is less than the thickness of the lower cladding layer.

5. The optical apparatus of claim 1 wherein the insulating layer comprises an epoxy.

6. The optical apparatus of claim 1 wherein the spacers comprise an epoxy that is at least partially cured and that has a glass transition temperature in a range from about 130° C. to about 160° C.

7. The optical apparatus of claim 1 wherein the spacers comprise an epoxy that is at least partially cured and that has a glass transition temperature in a range from about 140° C. to 180° C.

8. The optical apparatus of claim 1 wherein the spacers comprise an epoxy that is at least partially cured and that has a glass transition temperature of at least about 120° C.

9. The optical apparatus of claim 1 wherein the spacers comprise an epoxy that is at least partially cured and that has a glass transition temperature of at least about 130° C.

10. The optical apparatus of claim 1 wherein the first waveguide comprises a microlens disposed at its first end.

11. The optical apparatus of claim 1 wherein the thickness of the insulating layer is in the range of about 1 μm to about 4 μm.

12. The optical apparatus of claim 1 further comprising one or more additional waveguides, each additional waveguide being disposed over the top surface of the main substrate and having a first end and a second end, each additional waveguide further having a lower cladding layer disposed over the top surface and a core layer disposed over the lower cladding layer, the first end of each additional waveguide being disposed adjacent to a side of the attachment area.

13. The apparatus of claim 1 further comprising an opto-electric component, the opto-electric component comprising:
  a secondary substrate;
  a lower cladding layer disposed over a surface of the secondary substrate, a core layer disposed over the lower cladding layer, and an upper cladding layer disposed over the core layer;
  a top surface located over the upper cladding layer; and
  at least one conductive pad disposed over the top surface of the opto-electronic component; and
  wherein the opto-electric component is positioned so that its top surface faces the attachment area and abuts at least one spacer; and
  wherein the at least one conductive pad of the opto-electric component is conductively coupled to a conductive pad disposed on the insulating layer by a body of conductive material.

14. The apparatus of claim 13 wherein the body of conductive material comprises solder.

15. The apparatus of claim 13 wherein the body of conductive material comprises an indium-tin solder and wherein the top surface of one of the conductive pads comprises copper.

16. The optical apparatus of claim 13 wherein the core layer of the first waveguide has a centerline collinear with the propagation direction of light in the core layer and further has first thickness at the first end of the first waveguide, wherein the core layer of the opto-electric component has a centerline collinear with the propagation direction of light in the core layer and further has a second thickness in an area that faces the first end of the first waveguide, wherein the difference in the height levels of the first and second centerlines, as measured from a common plane, is less than a value of $½*T_S$, where $T_S$ is the larger one of the first and second thicknesses.

17. The optical apparatus of claim 13 wherein the planar interface between the first core layer and the first lower cladding layer at the first end of the first waveguide defines a first level above the top surface of the main substrate and wherein the top surface of the first core layer at the first end of the first waveguide defines a second level above the top surface of the main substrate;
  wherein the core layer of the opto-electric component has a first thickness at an area located adjacent to the first end of the first waveguide and located above a spacer, and wherein the upper cladding layer of the opto-electric component has a second thickness located in said adjacent area;
  wherein the tops of the spacers are below the second level by at least an amount equal to one-half the first thickness plus the second thickness; and
  wherein the tops of the spacers are not below the first level by more than an amount equal to one-half the first thickness plus the second thickness.

18. A method of forming an optical apparatus, comprising the steps of:
  (a) forming a first waveguide over the top surface of a main substrate, the first waveguide having a lower cladding layer, a core layer, a first end and a second end, the first end of the first waveguide being disposed adjacent to a side of an attachment area for an opto-electric component, wherein the interface plane between the core layer and the lower cladding layer has a height above the top surface of the main substrate;
  (b) forming an insulating layer over the attachment area;
  (c) forming a plurality of spacers over the insulating layer such that the tops of the spacers lie below the height of the interface plane between the core layer and lower cladding layer; and
  (d) forming a plurality of conductive pads over the insulating layer; and
  wherein the spacers and conductive pads are separately located from one another.

19. The method of claim 18 wherein step (d) precedes step (c).

20. The method of claim 18 wherein step (b) comprises the steps of:
  forming a layer of photo-epoxy over the attachment area;
  exposing the layer of photo-epoxy to a pattern of actinic radiation; and
  thereafter developing the exposed layer of photo-epoxy.

21. The method of claim 20 wherein step (b) further comprises the step of plasma-etching the photo-epoxy layer through a mask to remove portions of the insulating layer adjacent to the first end of the first waveguide, the step of plasma-etching occurring after the step of developing the layer of photo-epoxy.

22. The method of claim 18 wherein step (c) comprises the steps of:
  forming a layer of photo-epoxy;
  exposing the layer of photo-epoxy to a pattern of actinic radiation;
  thereafter developing the exposed layer of photo-epoxy;

heating the developed photo-epoxy layer to a temperature and for a period of time that is sufficient to raise the glass transition temperature (Tg) of said layer to a value that is above 120° C.

23. The method of claim 22 wherein the step of heating the developed photo-epoxy layer raises the glass transition temperature (Tg) of said layer to a value that is equal to or greater than about 130° C.

24. The method of claim 22 wherein the step of heating the developed photo-epoxy layer raises the glass transition temperature (Tg) of said layer to a value that is equal to or greater than about 140° C.

25. The method of claim 18 further comprising, after steps (a)–(d) have occurred, the step of bonding an opto-electric component to the attachment area, the opto-electric component having a plurality of conductive pads disposed on a first surface, said step including forming conductive bodies between the conductive pads of the opto-electric component and respective conductive pads disposed on the insulating layer.

26. The method of claim 25 wherein the step of forming the conductive bodies comprises forming pillars of solder material on a first set of conductive pads, the pillars having exposed top surfaces;

positioning the opto-electric component over the attachment area such that the top surfaces of the pillars face a second set of conductive pads; and pressing the opto-electric component and the main substrate together with the application of heat to the pillars such that the pillars bond to the second set of conductive pads, and such that the first surface of the opto-electric component contacts at least one spacer.

* * * * *